(12) United States Patent
Aruga

(10) Patent No.: US 7,837,331 B2
(45) Date of Patent: Nov. 23, 2010

(54) ILLUMINATOR AND PROJECTOR WITH INCREASED ILLUMINATION EFFICIENCY

(75) Inventor: Susumu Aruga, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 786 days.

(21) Appl. No.: 11/610,053

(22) Filed: Dec. 13, 2006

(65) Prior Publication Data

US 2007/0159603 A1 Jul. 12, 2007

(30) Foreign Application Priority Data

Jan. 10, 2006 (JP) .............................. 2006-002149

(51) Int. Cl.
- G03B 21/14 (2006.01)
- G03B 21/28 (2006.01)
- G02F 1/11 (2006.01)
- G02F 1/00 (2006.01)
- G02F 1/135 (2006.01)

(52) U.S. Cl. .................... 353/20; 353/99; 359/283; 359/485; 348/752; 349/30

(58) Field of Classification Search ................ 353/20, 353/98–99; 359/283, 483, 485; 348/752, 348/762, 767; 349/30
See application file for complete search history.

(56) References Cited

U.S. PATENT DOCUMENTS

| | | | |
|---|---|---|---|
| 4,864,390 A * | 9/1989 | McKechnie et al. | 348/751 |
| 6,231,192 B1 * | 5/2001 | Konno et al. | 353/69 |
| 6,930,797 B2 * | 8/2005 | Ramanujan et al. | 358/1.2 |
| 2003/0071973 A1 * | 4/2003 | Hansen et al. | 353/20 |
| 2003/0231497 A1 * | 12/2003 | Sakata et al. | 362/341 |
| 2007/0182932 A1 * | 8/2007 | Bakker et al. | 353/20 |

FOREIGN PATENT DOCUMENTS

| | | |
|---|---|---|
| JP | A 63-121821 | 5/1988 |
| JP | A-04-006516 | 1/1992 |
| JP | A 2002-244211 | 8/2002 |
| JP | A 2004-069996 | 3/2004 |

* cited by examiner

Primary Examiner—Georgia Y Epps
Assistant Examiner—Magda Cruz
(74) Attorney, Agent, or Firm—Oliff & Berridge, PLC

(57) ABSTRACT

An illuminator includes a light source that outputs light, a polarization separation device that separates the light outputted from the light source into polarization components of the first and second oscillation directions, the polarization components having mutually orthogonal polarizations, and a polarization conversion device that converts the polarization component of the second oscillation direction divided by the polarization separation device to the polarization component of the first oscillation direction. The polarization component of the first oscillation direction divided by the polarization separation device and the polarization component of the first oscillation direction converted by the polarization conversion device are incident on an incident surface of an illumination target from different directions from each other.

5 Claims, 5 Drawing Sheets

ILLUMINATOR AND PROJECTOR WITH INCREASED ILLUMINATION EFFICIENCY

BACKGROUND

1. Technical Field

The present invention relates to an illuminator and a projector and, more particularly, to a technology of an illuminator that is used with a spatial light modulator.

2. Related Art

A liquid crystal display device, which is used as a spatial light modulator of a projector, converts the polarization state of incident light and carries out modulation. In a case where the liquid crystal display device is used, light outputted from a light source can be efficiently used by converting the light from the light source into a polarization component of a predetermined oscillation direction and supplying the polarization component. JP-A-2004-69996 discloses a method of converting light into a polarization component of a predetermined oscillation direction and supplying the polarization component.

According to the method of JP-A-2004-69996, light from a light source needs to be focused on a surface of a polarizing beam splitter to efficiently polarize the light from the light source. As an emission region of the light source becomes smaller, the incident angle of the light that is incident on the surface of the polarizing beam splitter becomes wider. Accordingly, the light from the light source can be efficiently incident on the polarizing beam splitter. On the other hand, a light source having a large emission region may be used to display a bright image with the projector. Conventionally, as the emission region of the light source becomes larger, it is difficult for the light outputted from the light source to be efficiently incident on the polarizing beam splitter. As a result, it is difficult to reduce a decrease of illumination efficiency that results from adjustment of the polarization direction of light.

SUMMARY

An advantage of some aspects of the invention is that it provides an illuminator that can reduce a decrease of illumination efficiency that results from adjustment of the polarization direction of light, and a projector that can display a bright image with the illuminator.

According to an aspect of the invention, there is provided an illuminator including: a light source that outputs light; a polarization separation device that separates the light outputted from the light source into polarization components of the first and second oscillation directions, the polarization components having mutually orthogonal polarizations; and a polarization conversion device that converts the polarization component of the second oscillation direction divided by the polarization separation device to the polarization component of the first oscillation direction, in which the polarization component of the first oscillation direction divided by the polarization separation device and the polarization component of the first oscillation direction converted by the polarization conversion device are incident on an incident surface of an illumination target from different directions from each other The polarization component divided by the polarization separation device and the polarization component converted by the polarization conversion device are incident on an illumination target from different directions from each other, e.g., two inclined directions, such that the polarization component of the first oscillation direction is supplied to the spatial light modulator that is the illumination target. According to the aspect of the present invention, since it is not necessary to focus light on an incident side of the polarization separation device, it is possible to reduce a decrease of illumination efficiency that results from adjustment of the polarization direction of light even though a light source having a large emission region is used. Accordingly, it is possible to obtain an illuminator that reduces a decrease of illumination efficiency that results from adjustment of the polarization direction of light.

The polarization separation device may include a reflective polarizer that transmits the polarization component of the first oscillation direction and reflects the polarization component of the second oscillation direction, and the illuminator may include a reflector that reflects the polarization component of the first oscillation direction passing through the reflective polarizer. The polarization component of the first oscillation direction passing through the reflective polarizer is reflected by the reflector, and propagates towards the illumination target. The polarization component of the second oscillation direction reflected by the reflective polarizer is converted into the polarization component of the first oscillation direction by the polarization conversion device and propagates towards the illumination target. As a result, the polarization component of the first oscillation direction divided by the reflective polarizer and the polarization component of the first oscillation direction converted by the polarization conversion device can be incident on the illumination target.

The reflective polarizer and the reflector may be arranged to have different slopes from each other in a plane including a normal line of the reflective polarizer and a normal line of the reflector. By arranging the reflective polarizer and the reflector to have different slopes from each other, the polarization component of the first oscillation direction divided by the reflective polarizer and the polarization component of the first oscillation direction converted by the polarization conversion device can be incident on the illumination target from different directions from each other.

The reflective polarizer may be disposed such that light propagating along an optical axis of the light source has an incident angle of more than 45°, and the reflector may be disposed such that the light propagating along the optical axis of the light source has an incident angle of less than 45°. As a result, it is possible to configure such that the polarization component of the first oscillation direction divided by the reflective polarizer and the polarization component of the first oscillation direction converted by the polarization conversion device are incident on the illumination target.

According to another aspect of the present invention, there is provided a projector including: an illuminator that includes a light source that outputs light; a polarization separation device that separates the light outputted from the light source into polarization components of the first and second oscillation directions, the polarization components having mutually orthogonal polarizations; and a polarization conversion device that converts the polarization component of the second oscillation direction divided by the polarization separation device to the polarization component of the first oscillation direction; and a spatial light modulator that modulates the polarization component of the first oscillation direction from the illuminator according to an image signal, in which the polarization component of the first oscillation direction divided by the polarization separation device and the polarization component of the first oscillation direction converted by the polarization conversion device are incident on an incident surface of the spatial light modulator from different directions from each other. By reducing a decrease of illumination efficiency that results from adjustment of the polarization direction of light, it is possible to display a bright image. Accordingly, it is possible to obtain a projector that displays a bright image.

The spatial light modulator may convert the polarization component of the first oscillation direction into the polarization component of the second oscillation direction according to the image signal, and the polarization component of the second oscillation direction emitting from the spatial light modulator may be induced to a predetermined direction, and the polarization component of the first oscillation direction emitting from the spatial light modulator may be induced to directions other than the predetermined direction. The polarization component of the second oscillation direction from the spatial light modulator is used to display an image, and is induced towards a specific direction, e.g., towards the transmissive lens. The polarization component of the first oscillation direction from the spatial light modulator is not used to display an image, and is induced towards others than the transmissive lens. As a result, it is possible to display an image according to an image signal.

The polarization separation device may include a first reflective polarizer that transmits the polarization component of the first oscillation direction and reflects the polarization component of the second oscillation direction, the illuminator may include a reflector that reflects the polarization component of the first oscillation direction passing through the first reflective polarizer, and the projector may include a second reflective polarizer that is disposed at a position where light passing through the polarization conversion device and the spatial light modulator is incident, transmits the polarization component of the first oscillation direction, and reflects the polarization component of the second oscillation direction, and a third reflective polarizer that is disposed at a position where light passing through the reflector and the spatial light modulator is incident, transmits the polarization component of the first oscillation direction, and reflects the polarization component of the second oscillation direction. The polarization component of the second oscillation direction that is incident on the second reflective polarizer from the spatial light modulator is reflected by the second reflective polarizer, and propagates towards a specific direction. The polarization component of the first oscillation direction passing through the second reflective polarizer passes through the second reflective polarizer and propagates towards a different direction. The polarization component of the second oscillation direction that is incident on the third reflective polarizer from the spatial light modulator is reflected by the third reflective polarizer and propagates towards a specific direction. The polarization component of the first oscillation direction passing through the third reflective polarizer passes through the third reflective polarizer and propagates towards a different direction. As a result, it is possible to induce the polarization component of the second oscillation direction emitting from the spatial light modulator towards a specific direction, and it is possible to induce the polarization component of the first oscillation direction emitting from the spatial light modulator towards a direction other than the specific direction.

The illuminator may include a first polarization conversion device that converts the polarization component of the second oscillation direction divided by the first reflective polarizer to the polarization component of the first oscillation direction, and the projector may include a second polarization conversion device that converts the polarization component of the second oscillation direction reflected by the second reflective polarizer into the polarization component of the first oscillation direction, and allows the polarization component of the first oscillation direction to enter the third reflective polarizer. The polarization component of the second oscillation direction reflected by the second reflective polarizer is converted into the polarization component of the first oscillation direction by the second polarization conversion device and is incident on the third reflective polarizer. The polarization component of the first oscillation direction that is incident on the third reflective polarizer propagates towards a specific direction together with the polarization component of the second oscillation direction that is incident on the third reflective polarizer. As a result, it is possible to propagate light on the second reflective polarizer and light on the third reflective polarizer towards a specific direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the present invention will be described in detail with reference to the accompanying drawings.

Embodiment

Figure 1:
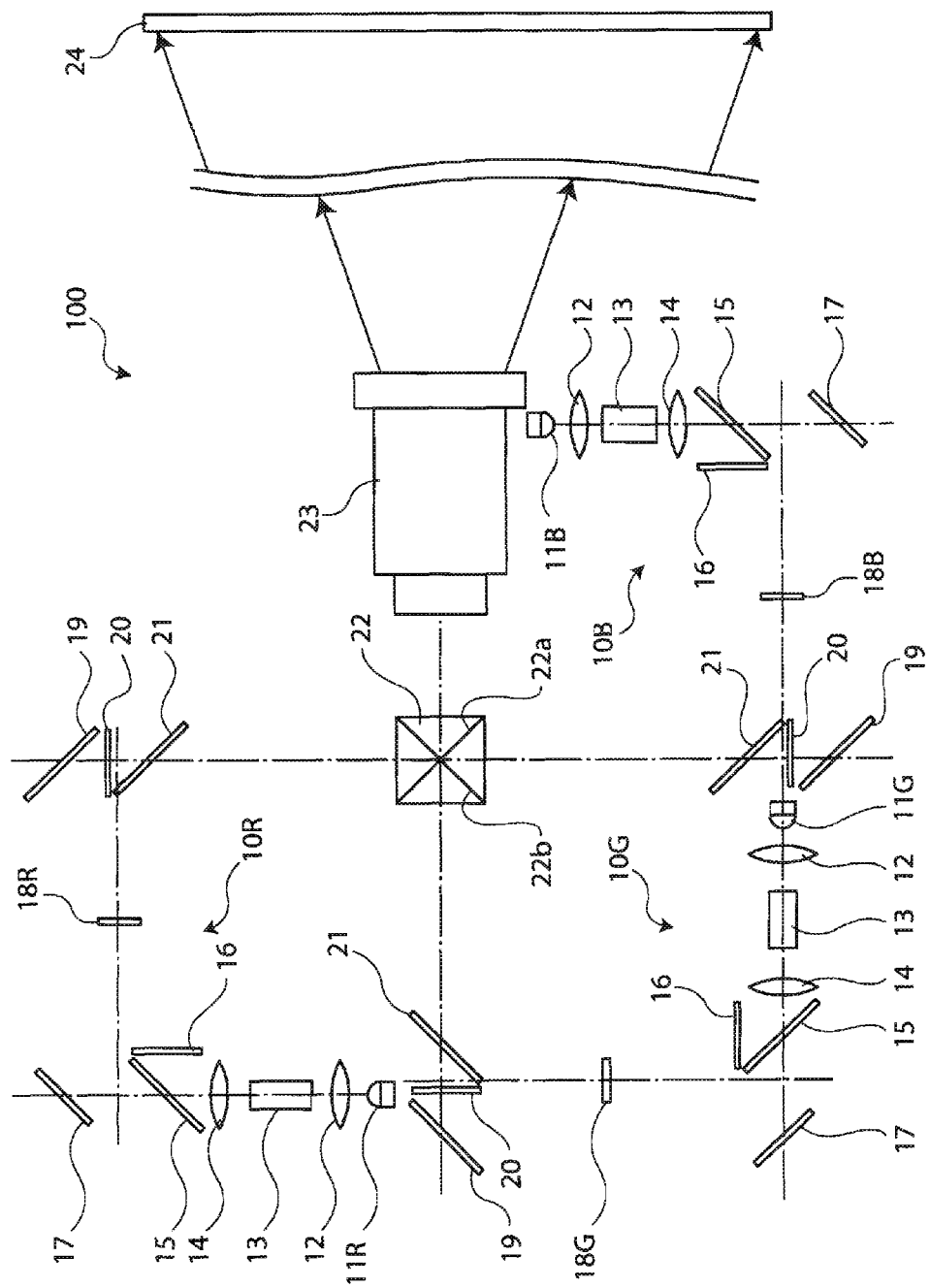
FIG. 1 illustrates the schematic configuration of a projector according to an embodiment of the present invention.

FIG. 1 illustrates the schematic configuration of a projector 100 according to an embodiment of the present invention. The projector 100 is a front-projection projector that outputs light to a screen 24 provided on a viewer side and allows viewers to view an image by light reflected by the screen 24. The projector 100 includes a red(R)-light component illuminator 10R, a green(G)-light component illuminator 10G, and a blue(B)-light component illuminator 10B.

Figure 2:
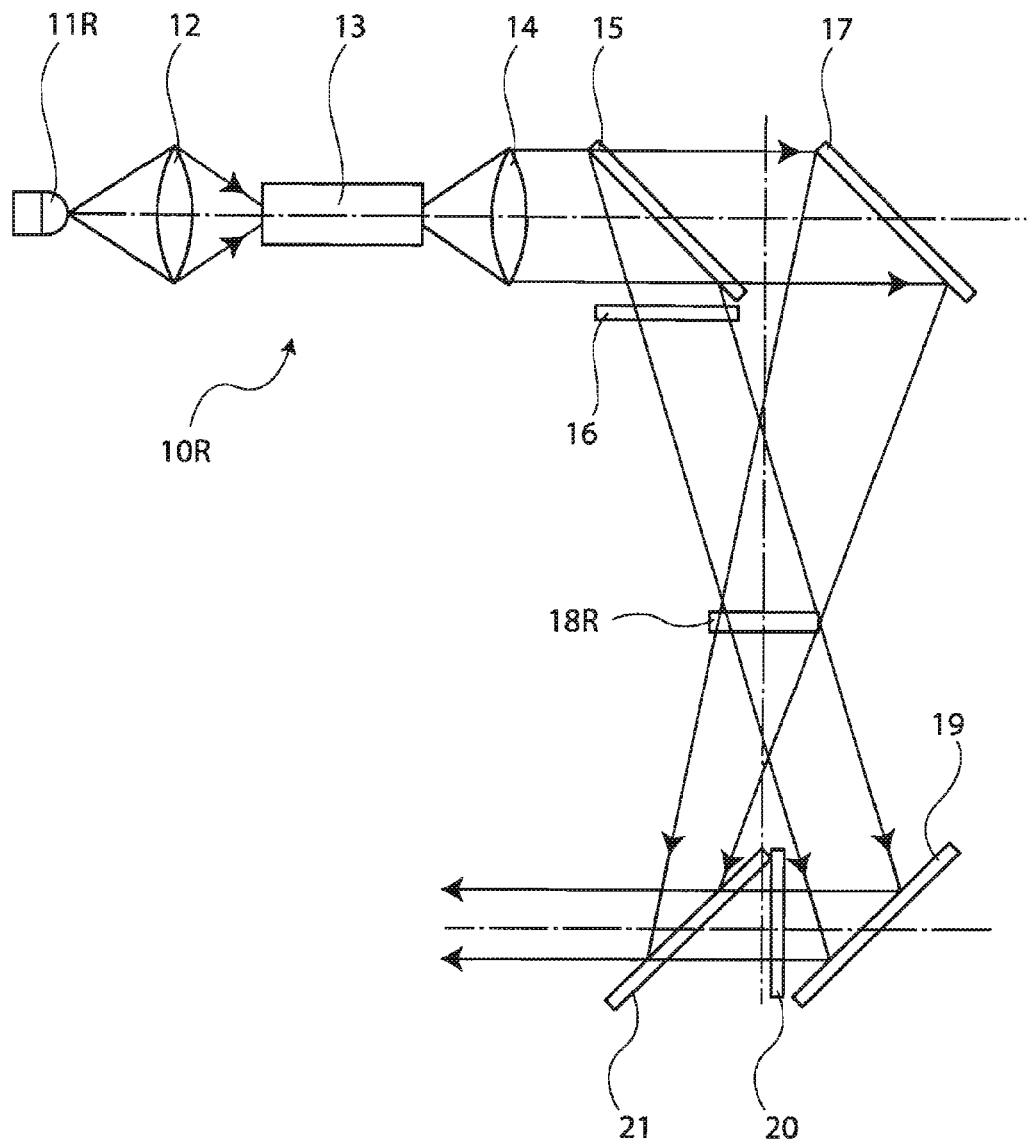
FIG. 2 illustrates an R-light component illuminator, and devices that are provided with respect to an R-light component.

FIG. 2 illustrates an R-light component illuminator 10R, and devices that are provided with respect to an R-light component. An R-light component LED 11R of the R-light component illuminator 10R is a light source of red-light component. The R-light component LED 11R is mainly a surface emitting light source that emits light from a surface of a chip. A condenser lens 12 condenses an R-light component from the R-light component LED 11R around an incident surface of a rod integrator 13. The rod integrator 13 has a transparent glass that is shaped in a rectangular parallelepiped shape. The R-light component that is incident on the rod integrator 13 is repeatedly totally reflected at an interface between the glass and air to propagate inside the rod integrator 13, thereby obtaining uniform distribution of the intensity of the R-light component from the R-light component LED 11R. The R-light component, which is made roughly uniform by the rod integrator 13, is collimated by a collimator lens 14 and is incident on a first reflective polarizer 15.

The first reflective polarizer 15 is a polarization separation device that separates the R-light component from the R-light component LED 11R into a polarization component of a the first oscillation direction and a polarization component of a the second oscillation direction by transmitting out of the R-light component from the R-light component LED 11R the polarization component of the first oscillation direction and reflecting the polarization component of the second oscillation direction. The polarization component of the first oscillation direction is, for example, a p-polarization component. The polarization component of the second oscillation direction is a polarization component of oscillation direction that is roughly orthogonal to the first oscillation direction, such as an s-polarization component. For example, a wire-grid type polarizer may be used as the first reflective polarizer 15.

The wire-grid type polarizer may be configured such that a wire made of metal, such as aluminum, is formed in a lattice shape on a substrate made of an optically transparent glass. The wire-grid type polarizer transmits a polarization component of an oscillation direction that is roughly perpendicular to the wire, and reflects a polarization component of an oscillation direction that is roughly parallel to the wire. The wire-grid type polarizer can transmit only a polarization component of a predetermined oscillation direction by providing the wire to be roughly perpendicular to the oscillation direction of the polarization component. Instead of the reflective polarizer, a polarizing beam splitter having a polarization separation film may be used as the polarization separation device.

A first polarization conversion device 16 is provided on an optical path between the first reflective polarizer 15 and an R-light component spatial light modulator 18R. The first polarization conversion device 16 converts an s-polarization component, which is the polarization component of the second oscillation direction from the first reflective polarizer 15, into a p-polarization component, which is the polarization component of the first oscillation direction. A λ/2 retardation plate may be used as the first polarization conversion device 16. The λ/2 retardation plate rotates a polarization direction of incident light by 90°. A reflector 17 is provided at a position where a light component passing through the first reflective polarizer 15 is incident. The reflector 17 reflects the p-polarization component, which is a polarization component of the first oscillation direction passing through the first reflective polarizer 15, towards the R-light component spatial light modulator 18R.

Referring to FIG. 2, the first reflective polarizer 15 is disposed at a left side as seen from a central line of the R-light component spatial light modulator 18R. The light component passing through the first reflective polarizer 15 and the first polarization conversion device 16 is incident on the R-light component spatial light modulator 18 in a diagonal direction from the left side of the R-light component spatial light modulator 18. The reflector 17 is disposed at a right side as seen from the central line of the R-light component spatial light modulator 18R. The light passing through the reflector 17 is incident on the R-light component spatial light modulator 18 in a diagonal direction from the right side of the R-light component spatial light modulator 18. That is, in the R-light component illuminator 10R, the light component passing through the reflector 17 from the first reflective polarizer 15, and the light component passing through the first polarization conversion device 16 from the first reflective polarizer 15 are incident on the incident surface of the R-light component spatial light modulator 18R from different directions from each other.

Figure 3:
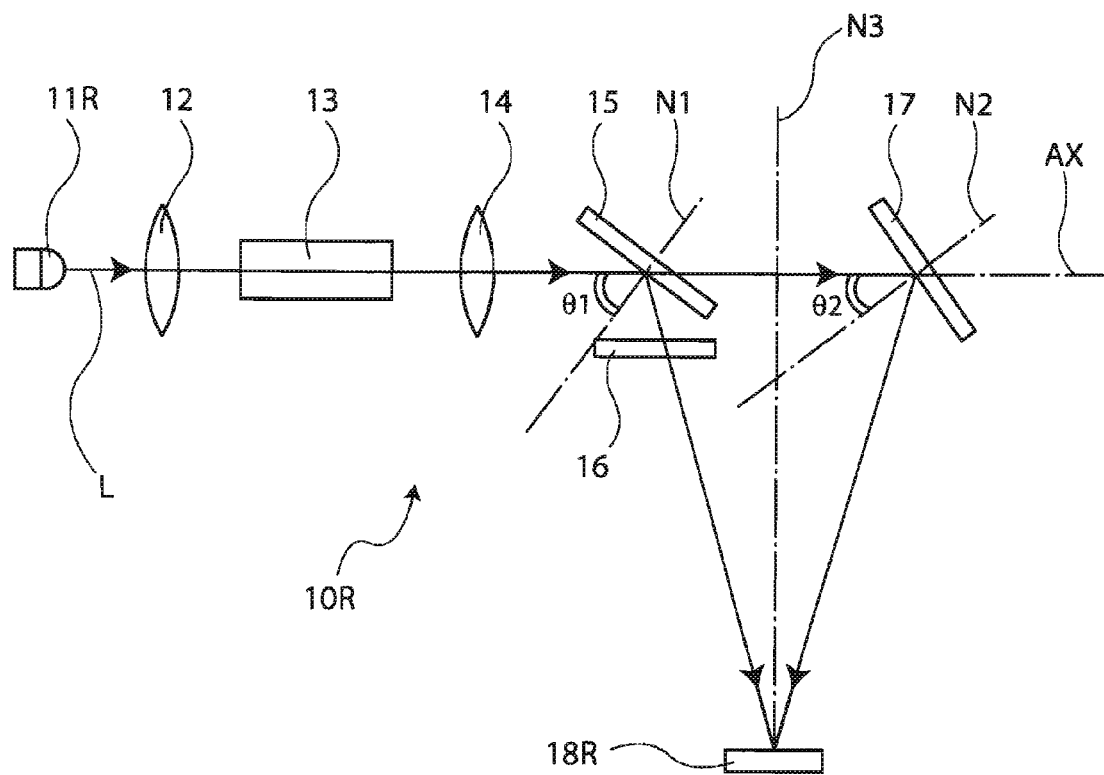
FIG. 3 illustrates the R-light component illuminator.

FIG. 3 illustrates the R-light component illuminator 10R. The first reflective polarizer 15 is disposed such that a light component L propagating along an optical axis AX of the R-light component LED 11R has an incident angle θ1 of more than 45°. The incident angle θ1 is an angle formed by a normal line N1 of the first reflective polarizer 15 and the light component L. The reflector 17 is disposed such that the light component L propagating along the optical axis AX of the R-light component LED 11R has an incident angle θ2 of less than 45°. The incident angle θ2 is an angle formed by a normal line N2 of the reflector 17 and the light component L. That is, the first reflective polarizer 15 and the reflector 17 are arranged to have different slopes from each other on a plane including the normal line N1 of the first reflective polarizer 15 and the normal line N2 of the reflector 17, i.e., a plane that is roughly parallel to a sheet of FIG. 3.

Since the first reflective polarizer 15 has an incident angle θ1 of more than 45°, the light component L reflected by the first reflective polarizer 15 is converted in angle by an angle of more than 90° by the first reflective polarizer 15. Since the reflector 17 has an incident angle θ2 of less than 45°, the light component L reflected by the reflector 17 is converted in angle by an angle of less than 90° by the reflector 17. As a result, the R-light component illuminator 10R is configured such that the light component L passing through the first reflective polarizer 15 and the reflector 17 and the light component L passing through the polarization conversion device 16 are incident on the R-light component spatial light modulator 18R.

Referring to FIG. 2, the R-light component spatial light modulator 18R is an illumination target of the R-light component illuminator 10R, and is a transmissive liquid crystal display device that modulates the R-light component according to an image signal. The R-light component spatial light modulator 18R converts the p-polarization component, which is a polarization component of the first oscillation direction, into the s-polarization component, which is a polarization component of the second oscillation direction, according to the image signal. A second reflective polarizer 19 is disposed at a position where the light passing through the first polarization conversion device 16 and the R-light component spatial light modulator 18R is incident. A third reflective polarizer 21 is disposed at a position where the light passing through the reflector 17 and the R-light component spatial light modulator 18R is incident. The second and third reflective polarizers 19 and 21 transmit the p-polarization component of the first oscillation direction and reflect the s-polarization component of the second oscillation direction.

A second polarization conversion device 20 is disposed on an optical path between the second and third reflective polarizers 19 and 21. The second polarization conversion device 20 converts the s-polarization component, which is a polarization component of the second oscillation direction that is reflected by the second reflective polarizer 19, into the p-polarization component, which is a polarization component of the first oscillation direction, and allows the p-polarization component to enter the third reflective polarizer 21. For example, a λ/2 retardation plate is used as the second polarization conversion device 20. Referring to FIG. 1, the light component from the third reflective polarizer 21 is incident on a cross dichroic prism 22.

A G-light component LED 11G of a G-light component illuminator 10G is a light source of green-light component. A G-light component spatial light modulator 18G is an illumination target of the G-light component illuminator 10G, and is a transmissive liquid crystal display device that modulates a G-light component according to an image signal. The G-light component spatial light modulator 18G converts a p-polarization component, which is a polarization component of the first oscillation direction, into an s-polarization component, which is a polarization component of the second oscillation direction, according to an image signal. Devices between the G-light component LED 11G and the cross dichroic prism 22 are the same as devices between the R-light component LED 11R and the cross dichroic prism 22.

A B-light component LED 11B of a B-light component illuminator 10B is a light source of blue-light component. A B-light component spatial light modulator 18B is an illumination target of the B-light component illuminator 10B, and is a transmissive liquid crystal display device that modulates a B-light component according to an image signal. The B-light component spatial light modulator 18B converts a p-polarization component, which is a polarization component of the first oscillation direction, into an s-polarization component, which is a polarization component of the second oscillation direction, according to the image signal. Devices between the B-light component LED 11B and the cross dichroic prism 22 are the same as devices between the B-light component LED 11B and the cross dichroic prism 22.

The cross dichroic prism 22 has two dichroic films 22a and 22b that are provided to be roughly orthogonal to each other. A first dichroic film 22a reflects an R-light component and transmits G- and B-light components. A second dichroic film 22b reflects the B-light component and transmits G- and R-light components. The cross dichroic prism 22 synthesizes the R-, G-, and B-light components that are modulated by the spatial light modulators 18R, 18G and 18B, respectively A transmissive lens 23 projects the light components synthesized by the cross dichroic prism 22 onto the screen 24. In the invention, the illuminator includes devices provided in an optical path before the spatial light modulator by the light from the light source.

Figure 4:
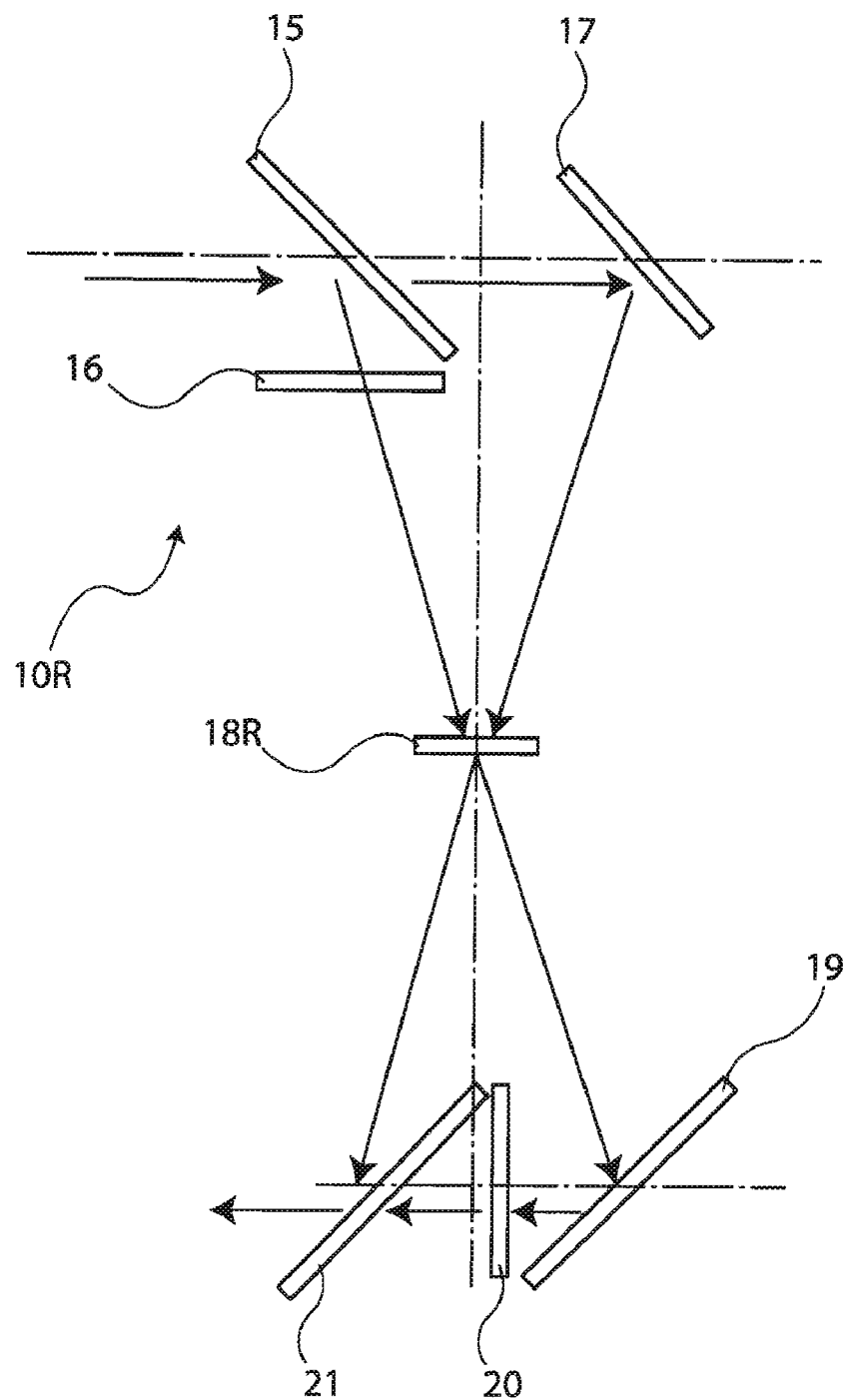
FIG. 4 is a view for explaining action of light propagating from the R-light component illuminator towards the R-light component spatial light modulator.

FIG. 4 is a view for explaining action of light propagating from the R-light component illuminator 10R towards the R-light component spatial light modulator 18R, and action of light emitting from the R-light component spatial light modulator 18R. The p-polarization component among light that is incident on the first reflective polarizer 15 passes through the first reflective polarizer 15 and is incident on the reflector 17. The p-polarization component that is incident on the reflector 17 is reflected by the reflector 17, and propagates to the R-light component spatial light modulator 18R. The s-polarization component among light that is incident on the first reflective polarizer 15 is reflected by the first reflective polarizer 15, and is incident on the first polarization conversion device 16, The s-polarization component that is incident on the first polarization conversion device 16 is converted to the p-polarization component by the first polarization conversion device 16, and is incident on the R-light component spatial light modulator 18R.

The R-light component spatial light modulator 18R converts the p-polarization component to the s-polarization component according to an image signal. The s-polarization component among light that passes through the reflector 17 and the R-light component spatial light modulator 18R and is incident on the third reflective polarizer 21 is reflected by the third reflective polarizer 21. The s-polarization component reflected by the third reflective polarizer 21 passes through the cross dichroic prism 22 and propagates in a specific direction, i.e., in the direction toward the transmissive lens 23 (see FIG. 1). The s-polarization component among light that passes through the first polarization conversion device 16 and the R-light component spatial light modulator 18R and is incident on the second reflective polarizer 19 is reflected by the second reflective polarizer 19. The s-polarization component reflected by the second reflective polarizer 19 is incident on the second polarization conversion device 20. The s-polarization component that is incident on the second polarization conversion device 20 is converted into the p-polarization component, and is incident on the third reflective polarizer 21. The p-polarization component that is incident on the third reflective polarizer 21 passes through the third reflective polarizer 21, and passes through the cross dichroic prism 22 and propagates towards the transmissive lens 23. As a result, the s-polarization component from the R-light component spatial light modulator 18R propagates towards the transmissive lens 23 as a light component used to display images.

Figure 5:
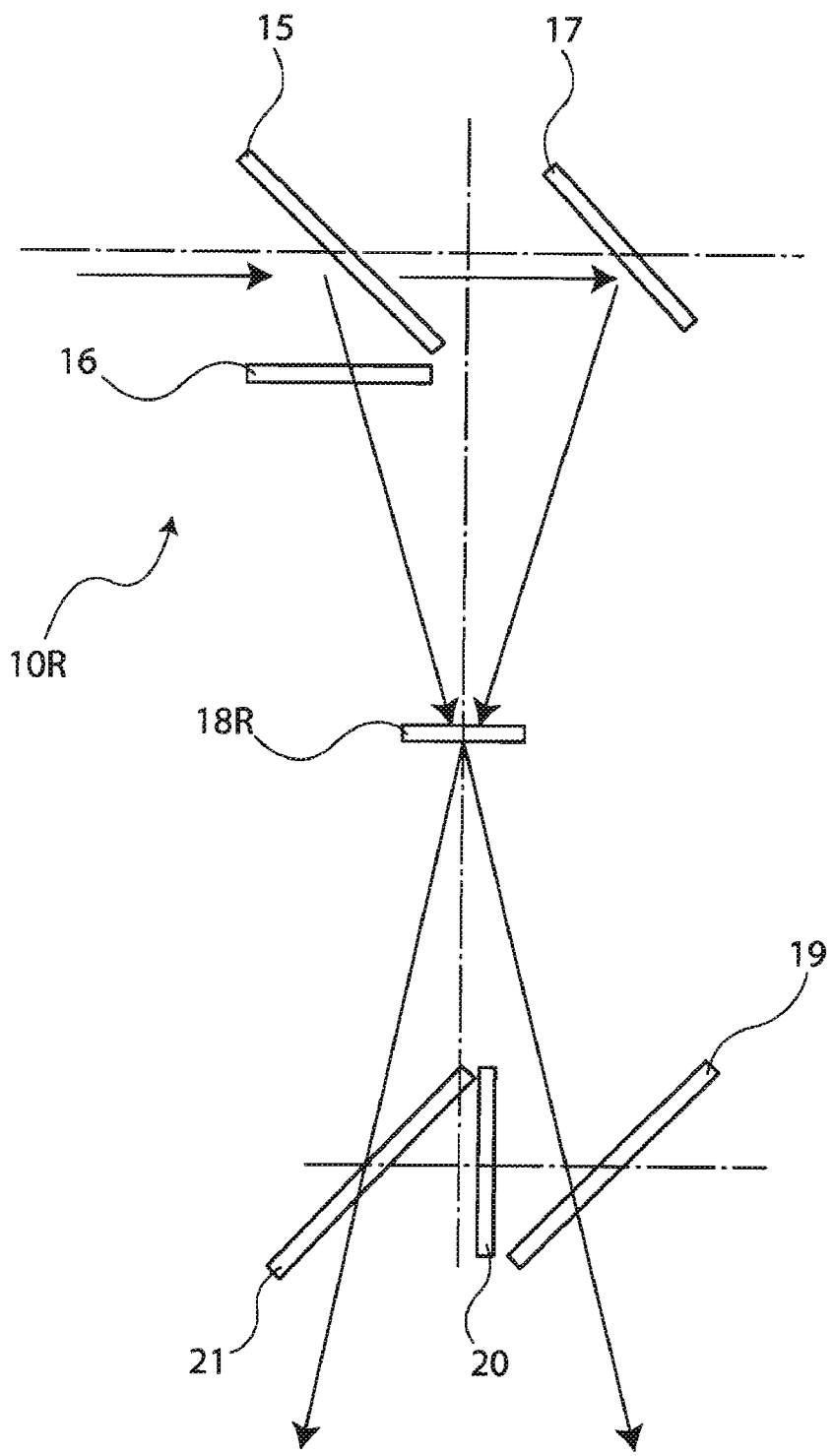
FIG. 5 is a view for explaining action of the p-polarization component emitting from the R-light component spatial light modulator.

FIG. 5 is a view for explaining action of the p-polarization component emitting from the R-light component spatial light modulator 18R. A p-polarization component among light that passes through the reflector 17 and the R-light component spatial light modulator 18R and is incident on the third reflective polarizer 21 passes through the third reflective polarizer 21. The p-polarization component passing through the third reflective polarizer 21 propagates in the direction other than the direction toward the transmissive lens 23. The p-polarization component among light that passes through the first polarization modulation device 16 and the R-light component spatial light modulator 18R and is incident on the second reflective polarizer 19 passes through the second reflective polarizer 19. The p-polarization component passing through the second reflective polarizer 19 propagates in the direction other than the direction toward the transmissive lens 23.

As a result, the p-polarization component from the R-light component spatial light modulator 18R is one other than a light component used to display an image, and propagates towards others than the transmissive lens 23, such that the projector 100 forms an image according to an image signal. The projector 100 may be configured to absorb a p-polarization component passing through the second reflective polarizer 19 or a p-polarization component passing through the third reflective polarizer 21. As a result, it is possible to reduce generation of stray light.

According to the present invention, since it is not necessary to focus light on an incident side of a polarization separation device, it is possible to reduce a decrease of illumination efficiency that results from adjustment of the polarization direction of light even though a light source having a large emission region is used. It is possible to display a bright image by reducing the decrease of illumination efficiency that results from adjustment of the polarization direction of light. In addition, the projector 100 may use a spatial light modulator that converts an s-polarization component into a p-polarization component according to an image signal. In this case, an illuminator may be configured to supply the s-polarization component to the spatial light modulator. Further, the projector 100 may be configured to induce the p-polarization component from the spatial light modulator towards the transmissive lens and to induce the s-polarization component to others than the transmissive lens.

While an LED is used as a light source in the present embodiment, but other solid light emitting elements, such as EL device or semiconductor laser, may be used as the light source instead of the LED. In addition, other light emitting elements than the solid light emitting element, such as extra-high pressure mercury lamp, may be used as the light source. In addition to the projector that uses three transmissive liquid crystal display devices, the projector may be configured to use a single transmissive liquid crystal display device or reflective liquid crystal display device, or to use a micromirror array device. The projector is not limited to a front-projection projector, but may be a rear-projection projector that supplies laser on one surface of a screen and allows viewers to view light emitting from the other surface of the screen and to view an image.

As apparent from the above description, the illuminator according to the embodiment of the invention can be efficiently used as an illuminator for a projector. In particular, the illuminator is appropriate for a projector that modulates a polarization component of a specific oscillation direction.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the sprit and scope of the invention.

The entire disclosure of Japanese Patent Application No. 2006-2149, filed Jan. 10, 2006 is expressly incorporated by reference herein.

What is claimed is:

1. An illuminator comprising:
a light source that outputs light;
a polarization separation device that separates the light outputted from the light source into polarization components of the first and second oscillation directions, the polarization components having mutually orthogonal polarizations, the polarization separation device includes a reflective polarizer that transmits the polarization component of the first oscillation direction and reflects the polarization component of the second oscillation direction;
a reflector that reflects the polarization component of the first oscillation direction passing through the reflective polarizer, the reflective polarizer and the reflector are arranged to have different slopes from each other in a plane including a normal line of the reflective polarizer and a normal line of the reflector; and
a polarization conversion device that converts the polarization component of the second oscillation direction divided by the polarization separation device to the polarization component of the first oscillation direction,
wherein the polarization component of the first oscillation direction divided by the polarization separation device and the polarization component of the first oscillation direction converted by the polarization conversion device are incident on an incident surface of an illumination target from different directions from each other.

2. The illuminator according to claim 1,
wherein the reflective polarizer is disposed such that light propagating along an optical axis of the light source has an incident angle of more than 45°, and
the reflector is disposed such that the light propagating along the optical axis of the light source has an incident angle of less than 45°.

3. A projector comprising:
an illuminator that includes
a light source that outputs light;
a polarization separation device that separates the light outputted from the light source into polarization components of the first and second oscillation directions, the polarization components having mutually orthogonal polarizations, the polarization separation device includes a first reflective polarizer that transmits the polarization component of the first oscillation direction and reflects the polarization component of the second oscillation direction;
a reflector that reflects the polarization component of the first oscillation direction passing through the first reflective polarizer; and
a polarization conversion device that converts the polarization component of the second oscillation direction divided by the polarization separation device to the polarization component of the first oscillation direction; and
a spatial light modulator that modulates the polarization component of the first oscillation direction from the illuminator according to an image signal,
the polarization component of the first oscillation direction divided by the polarization separation device and the polarization component of the first oscillation direction converted by the polarization conversion device are incident on an incident surface of the spatial light modulator from different directions from each other;
a second reflective polarizer that is disposed at a position where light passing through the polarization conversion device and the spatial light modulator is incident, transmits the polarization component of the first oscillation direction, and reflects the polarization component of the second oscillation direction; and
a third reflective polarizer that is disposed at a position where light passing through the reflector and the spatial light modulator is incident, transmits the polarization component of the first oscillation direction, and reflects the polarization component of the second oscillation direction.

4. The projector according to claim 3,
wherein the spatial light modulator converts the polarization component of the first oscillation direction into the polarization component of the second oscillation direction according to the image signal, and
the polarization component of the second oscillation direction emitting from the spatial light modulator is induced to a predetermined direction, and the polarization component of the first oscillation direction emitting from the spatial light modulator is induced to directions other than the predetermined direction.

5. The projector according to claim 3,
wherein the illuminator includes a first polarization conversion device that converts the polarization component of the second oscillation direction divided by the first reflective polarizer to the polarization component of the first oscillation direction, and
wherein the projector further includes a second polarization conversion device that converts the polarization component of the second oscillation direction reflected by the second reflective polarizer into the polarization component of the first oscillation direction, and transmits the polarization component of the first oscillation direction to the third reflective polarizer.

* * * * *